(12) United States Patent
Weber

(10) Patent No.: US 10,947,797 B2
(45) Date of Patent: Mar. 16, 2021

(54) SYSTEMS AND METHODS FOR SEPARATING FLUID MIXTURES

(71) Applicant: Wildcat Fluids LLC, Mathis, TX (US)

(72) Inventor: Jeffery P. Weber, Mathis, TX (US)

(73) Assignee: Wildcat Fluids LLC, Mathis, TX (US)

( * ) Notice: Subject to any disclaimer, the term of this patent is extended or adjusted under 35 U.S.C. 154(b) by 0 days.

(21) Appl. No.: 16/428,235

(22) Filed: May 31, 2019

(65) Prior Publication Data
US 2020/0378199 A1 Dec. 3, 2020

(51) Int. Cl.
| E21B 21/06 | (2006.01) |
| B07B 13/14 | (2006.01) |
| B07B 1/46 | (2006.01) |

(52) U.S. Cl.
CPC .............. *E21B 21/065* (2013.01); *B07B 1/46* (2013.01); *B07B 13/14* (2013.01)

(58) Field of Classification Search
CPC ................................ E21B 21/06; B01D 21/00
See application file for complete search history.

(56) References Cited

U.S. PATENT DOCUMENTS

| | | | |
|---|---|---|---|
| 4,116,835 A * | 9/1978 | Bertelson | B01D 29/08 210/100 |
| 4,462,416 A * | 7/1984 | George et al. | B08B 3/00 134/104 |
| 5,582,727 A * | 12/1996 | Foster | B01D 21/26 210/258 |
| 6,214,092 B1 | 4/2001 | Odom | |
| 6,506,310 B2 | 1/2003 | Kulbeth | |
| 6,808,626 B2 | 10/2004 | Kulbeth | |
| 7,296,640 B2 * | 11/2007 | Tettleton | E21B 21/06 175/66 |
| 7,514,011 B2 * | 4/2009 | Kulbeth et al. | E21B 21/06 210/780 |
| 8,152,911 B1 | 4/2012 | Williams et al. | |
| 8,158,000 B2 | 4/2012 | Newman | |
| 8,202,336 B1 * | 6/2012 | Moe et al. | B01D 50/00 55/318 |
| 8,449,779 B2 | 5/2013 | Thompson | |
| 8,517,167 B2 | 8/2013 | Thompson | |
| 8,877,064 B2 | 11/2014 | Dixit et al. | |
| 9,597,614 B2 | 3/2017 | Thompson | |
| 9,687,761 B2 | 6/2017 | Thompson | |
| 2004/0057839 A1 | 3/2004 | Crawford, III | |
| 2013/0126448 A1 * | 5/2013 | McCabe et al. | 210/801 |
| 2017/0252674 A1 | 9/2017 | Thompson | |

OTHER PUBLICATIONS

Rain for Rent, Steel Tank Diffuser Tank, advertisement flyer, https://www.rainforrent.com/equipment/diffuser-tank/.

* cited by examiner

*Primary Examiner* — William D Hutton, Jr.
*Assistant Examiner* — Avi T Skaist
(74) *Attorney, Agent, or Firm* — Victor H. Segura

(57) ABSTRACT

Systems and methods for separating a flowback mixture received from a wellbore. Employing a vessel with internal chambers to receive the mixture and employing eductors and a shaker to manage the separation of the mixture to produce a supply of solids-free liquid ready for reuse.

20 Claims, 4 Drawing Sheets

SYSTEMS AND METHODS FOR SEPARATING FLUID MIXTURES

CROSS-REFERENCE TO RELATED APPLICATIONS

Not applicable.

STATEMENT REGARDING FEDERALLY SPONSORED RESEARCH

Not applicable.

TECHNICAL FIELD OF THE INVENTION

This disclosure relates generally to techniques for collecting and handling fluid mixtures, and more particularly to systems for separating solids from fluid mixtures.

BACKGROUND

In the oilfield industry, the completion of subsurface wells to produce hydrocarbons entails the insertion of casing tubulars into a wellbore traversing the subsurface formations. Specialized tools are then inserted into the casing to perforate the walls of the tubular at desired subsurface locations in order to allow the hydrocarbons in the surrounding formation to flow into the casing for collection at the surface. Once the casing is perforated, a well stimulation technique known as hydraulic fracturing is applied to create cracks in the rock formations surrounding the wellbore to create fissures or fractures through which natural gas, hydrocarbons, and other fluids can flow more freely. In this process, a fluid is injected into the casing at high pressure to penetrate the formation via the perforations in the casing. Fracturing of a particular stage along the casing requires isolation of casing sections. In this way, the hydraulic fracture is created at the location of the perforations. In such operations, a "plug" is set in the casing to seal off the casing section to receive the high-pressure fluid. Once the fracture is initiated, a propping agent, such as sand, is added to the fluid injected into the wellbore.

After all the stages along the casing have been fractured, the series of plugs are removed so that the well can be produced via the perforations from all the stages. It is common during this drill out process to utilize a coil tubing unit or work over rig to remove the plugs placed in the well during the fracturing process. A shortcoming of plugs that are drilled out is that they leave debris in the wellbore. This debris can create problems with subsequent operations in the well, or at the surface, should it be produced. As oil and gas begin to flow into the wellbore, unwanted fluids and gasses, as well as unwanted particulates from the strata (including, sand, salts, etc.), combine with the plug debris forming a fluid mixture in the wellbore.

The fluid mixture is brought to the surface through a hydraulic process and the fluid is separated into hydrocarbon and water streams and the water is recirculated as part of the drill out process. The combined stream of Gas/Liquid Hydrocarbon/Solids/Water are generally referred to as "Flowback." Simple frac tanks are commonly used to collect the unwanted Flowback from the wellbore. When the frac tank is full of collected fluids, sand, salts, gasses, etc., different techniques are used to process its contents. The collection, removal, and decontamination of the Flowback is an expensive process. In some cases, environmentally approved services are employed to remove the Flowback collected in the tank. A need remains for improved techniques for separating and reclaiming Flowback arriving at the surface from a wellbore.

SUMMARY

According to an aspect of the invention, a system for separating solids from a fluid mixture includes a vessel having a first chamber to receive a solid-laden fluid mixture; at least one eductor disposed in the first vessel chamber to flow the solid-laden fluid mixture to a shaker; the shaker configured to separate liquids from the solid-laden fluid mixture for return of the separated liquids to a second chamber in the vessel; and the vessel having an outlet to allow for flow of the separated liquids from the vessel.

According to another aspect of the invention, a method for separating solids from a fluid mixture includes admitting a solid-laden fluid mixture into a first chamber of a vessel; flowing the solid-laden fluid mixture to a shaker with at least one eductor disposed in the first vessel chamber; separating liquids from the solid-laden fluid mixture with the shaker; returning separated liquids from the solid-laden fluid mixture to a second chamber in the vessel; and providing for flow of the separated liquids from the vessel via an outlet on the vessel.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are described in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

Once the Flowback arrives at the surface, the mixture is carried as a slurry and it is typically passed through a choke manifold and into a degasser device. The degasser device removes the gas from the slurry and allows the gas to safely vent to atmosphere or vent to a flare line. Once the gas phase of the slurry is removed, the resulting Water/Solids/Liquid Hydrocarbon mixture is ready for separation into three distinct phases.

Figure 1:
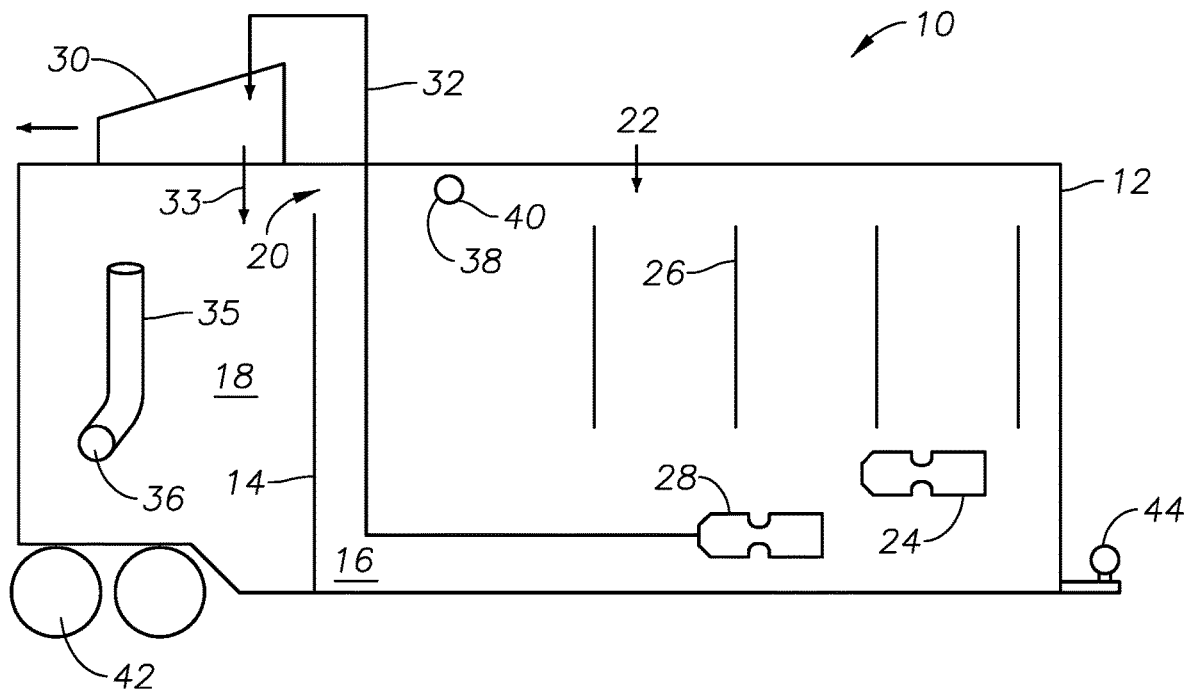
FIG. 1 depicts a schematic of a system configured to separate a fluid mixture in accordance with embodiments of the disclosure.

FIG. 1 depicts an embodiment of this disclosure. A system 10 includes a container vessel 12. Although depicted in a side view, the vessel 12 has a generally rectangular or square shape, with a top, bottom, two side walls, and two end walls. In some embodiments, the vessel 12 shape may be rectangular with a round bottom, rectangular with a flat bottom, or rectangular with a "V" shaped bottom. The vessel 12 is formed of metal and manufactured via a process well known by those skilled in the art (e.g., trailer, tank, container manufacturing). The vessel 12 is formed with a fluid-tight inner compartment. The vessel 12 may be produced using metals (e.g. stainless steel, alloys, etc.) in combination with non-metallic components (e.g. PVC, carbon fiber composites, plastics, etc.) as desired for the particular application. A vertical weir 14 in the vessel 12 divides the inner compartment into a first chamber 16 and a second chamber 18. The weir 14 forms a wall running from the floor of the vessel 12, from one side to the other, almost reaching the top of the vessel. A space 20 is left near the top of the inner compartment, allowing for fluid communication via overflow between the chambers 16, 18.

As described above, the Flowback slurry is typically passed through a degasser device as it is received from the wellbore (not shown in FIG. 1). FIG. 1 depicts the remaining solid-laden fluid mixture 22 being introduced into the first chamber 16 in the vessel 12. The solid-laden slurry 22 is conveyed to the vessel chamber 16 via conventional conduits or piping as known in the art. Embodiments of the vessel 12 may have an open or sealed top. In sealed-top embodiments, the vessel 12 may be configured with appropriate ports or hatches to allow for introduction of the fluid mixture 22. In open-top embodiments, the vessel 12 may be implemented with grating forming the top of the vessel.

Once the fluid mixture 22 enters the first chamber 16, the solids and water phases of the slurry falls to the bottom area of the chamber.

The vessel 12 includes one or more tank eductors 24 mounted inside the first chamber 16, near the bottom of the chamber. As well known in the art, eductors (also known as jet pumps) utilize the venturi principle to cause the flow of liquid mixtures. Eductors operate on the basic principles of flow dynamics. This involves taking a high-pressure motive stream and accelerating it through a tapered nozzle to increase the velocity of the fluid (gas or liquid) that is put through the nozzle. This fluid is then carried on through a secondary chamber where the friction between the molecules of it and a secondary fluid (generally referred to as the suction fluid) causes this fluid to be pumped. These fluids are intimately mixed together and discharged from the eductor. Conventional commercial eductors can be used in implementations of the disclosed embodiments. Further description of conventional eductors may be found at the Northeast Controls Inc. website (http://www.nciweb.net/eductor1.htm).

When activated, the tank eductor(s) 24 in the first chamber 16 agitates the fluid mixture to create a turbid zone in the lower section of the chamber. The agitation caused by the tank eductor(s) 24 keeps the solids (typically sand) suspended in the fluid mixture. In some embodiments, the vessel 12 also includes one or more baffles 26 mounted inside the first chamber 16 to create a placid zone near the top of the chamber to promote collection of liquid hydrocarbons at the fluid surface. The baffle(s) 26 may be rigidly mounted in a vertical position or configured to pivot to provide angled baffling as desired. It will be appreciated by those skilled in the art that the baffle(s) 26 may be formed of any suitable material and mounted inside the chamber 16 with conventional fasteners and hardware as known in the art.

The vessel 12 incorporates one or more additional eductors 28 mounted in the first chamber 16. In operation, once the solids in the mixture 22 are suspended via activation of the tank eductor(s) 24, the additional eductor(s) 28 draws the liquid/solids mixture from the chamber for flow of the mixture to a shaker 30 to separate the solids into a distinct phase and the fluids into a disparate and distinct phase. A hose or conduit 32 is coupled to the eductor(s) 28 to convey the fluid mixture from the eductor to the shaker 30. Shakers, also known as shale shakers, are well known in the oilfield and mining industries. They provide a vibrating sieve configuration to remove solids from a solid-laden fluid mixture. One or more screens are used in the shaker to filter the fluid mixtures flowing through the shaker. The liquid phase of the mixture (generally water) passes through the screen(s) and falls below the shaker table, while solids are retained and conveyed off the device. Conventional commercial shakers can be used in implementations of the disclosed embodiments. For example, suitable shakers are manufactured by BRANDT™, in Conroe, Tex.

In some embodiments, the shaker 30 is positioned above the second chamber 18, allowing the liquids 33 separated from the fluid mixture to be gravity fed into the second chamber. The dry solids (e.g. sand) exit the shaker 30 and fall to an awaiting vessel for disposal (not shown). In other embodiments, the shaker 30 may be positioned at another location (e.g. beside the vessel 12) and the separated liquids may be conveyed to the second chamber 18 via conduit means.

Once the separated fluid in the second chamber 18 gets to a certain height, it will flow into a standpipe 35 mounted in the chamber. The standpipe 35 is coupled to a discharge port 36 formed at the side of the vessel 12. The discharge port 36 provides an outlet for the separated liquids to be conveyed to a separate storage tank or other location as desired. The discharge port 36 is configured to permit the connection of a hose or other conduit means as known in the art. The discharge port 36 is positioned on one of the vessel 12 side walls, near the lower section of the vessel to allow the separated fluids to flow from the chamber 18 via gravity feed. In some embodiments, a pump may be disposed in the second chamber 18 to flow the separated fluids under pressure.

A skimmer 38 is mounted in the first chamber 16 to collect mediums lighter than water (e.g. oil) contained in the solid-laden fluid mixture. The liquid hydrocarbon phase in the mixture has a natural proclivity to rise to the top of the chamber 16. As the liquid hydrocarbon collects it is recovered through the skimmer 38 near the top of the chamber 16. In some embodiments, the skimmer 38 consists of a slotted pipe extending across the width of the chamber 16. The lighter-than-water medium enters the slots in the skimmer 38 and is conveyed out of the vessel 12 via a skimmer port 40. The lighter-than-water liquid hydrocarbon is then transferred via a hose or conduit to be collected in an awaiting exterior tank (not shown). The lighter-than-water medium flows out of the skimmer port 40 via gravity feed as the vessel 12 processes the liquid mixtures admitted into the first chamber 16 as described herein. In some embodiments, the skimmer 38 may be configured to move up and down within the vessel 12 interior, floating near the surface of the contained liquid mixture (e.g., by forming the skimmer from appropriate materials that float). In such embodiments, the skimmer 38 may be connected to a hose coupled to the discharge port 40 and may include a pump to expel the lighter-than-water medium when the fluid level is below the port. It will be appreciated by those skilled in the art that the skimmer 38 may be configured and mounted within the vessel 12 in different ways as known in the art.

The system 10 may be used as a permanently installed unit at a desired location (indoors or outdoors). Alternatively, the system 10 may also be configured for mobile use. In some embodiments, the vessel 12 is configured with wheels for on-road transport. FIG. 1 depicts an embodiment with a pair of axles/tires 42 disposed on one end of the vessel 12. The axles/tires 42 are mounted on the vessel 12 and may be configured with brake systems via conventional techniques as known in the art. Embodiments may also be configured with lights to meet road vehicle requirements. The vessel 12 is also equipped with a conventional trailer hitch 44 at the opposite end for connection to a hauling vehicle.

Figure 2:
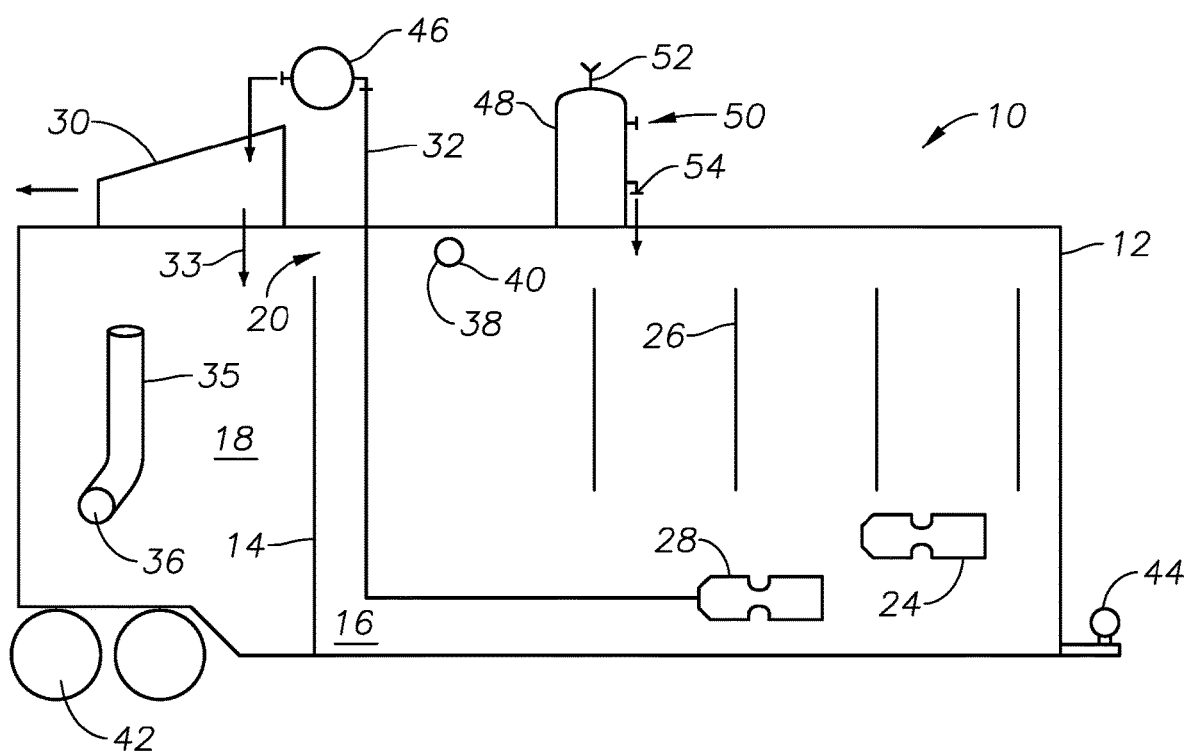
FIG. 2 depicts a schematic of another system configured to separate a fluid mixture in accordance with embodiments of the disclosure.

FIG. 2 depicts another embodiment of a system 10. This system is similar to the embodiment of FIG. 1, with some additional features. When activated, the eductor(s) 28 may convey the slurry mixture from the first chamber 16 to the shaker 30 at high velocity, which may hit the shaker with excessive force. A separator 46 mounted adjacent to the shaker 30 may be used to control the velocity of the fluid mixture as it is introduced into the shaker. The separator 46 may be either a cyclonic action device to remove solids from a fluid stream or a diffusion device to act as an inertial dampener prior to depositing the solid-laden fluid stream on the shaker 30 table. A conventional hydrocyclone solids-water separator may be used as known in the art. For example, suitable hydrocyclones are manufactured by WEIR™ and further description of hydrocyclone operation may be found at the following website: (https://www.global-weir/products/hydrocyclones). With a hydrocyclone separator 46, separated solids can be conveyed via a conduit for discharge along with the solids discharged from the shaker 30 and the remaining liquids can be passed through the shaker. A diffuser separator 46 may be implemented with a slotted discharge pipe configuration, a small-to-larger diameter piping system, or other structure as known in the art to dampen or slow and spread the fluid stream from the eductor 28 as it is deposited onto the shaker 30.

The embodiment of FIG. 2 is equipped with a degasser device 48 to perform the action of separating the gas phase from the mixture received from the wellbore prior to releasing the other three phases for additional processing by the system 10. The Flowback mixture to be treated in the vessel 12 is transported to the degasser 48 via conventional fluid transport systems used in oilfield operations (not shown) and enters the degasser via an inlet port 50. A suitable degasser device 48 is disclosed in U.S. patent application Ser. No. 16/427,858, filed on May 31, 2019, assigned to the present assignee and incorporated herein by reference in its entirety.

The degasser 48 collects the received four-phase mixture and separates the gas vapor phase from the solids and liquids. The separated gas is discharged through a gas discharge port 52 in the degasser 48. Depending on the application and types of gases involved, the discharge port 52 may be linked via conduits to vent the gas to a flare stack for burn off or to vent the gas safely to the atmosphere. The degasser 48 includes a discharge port 54 for the remaining solids and liquids. With the degasser 48 mounted at the top of the vessel 12, the fluids and solids are discharged from the degasser and fall into the first chamber 16 via gravity feed. As the first chamber 16 fills with the solid-laden mixture, the eductors 24, 28 are activated to operate the system 10 as described herein.

Figure 3:
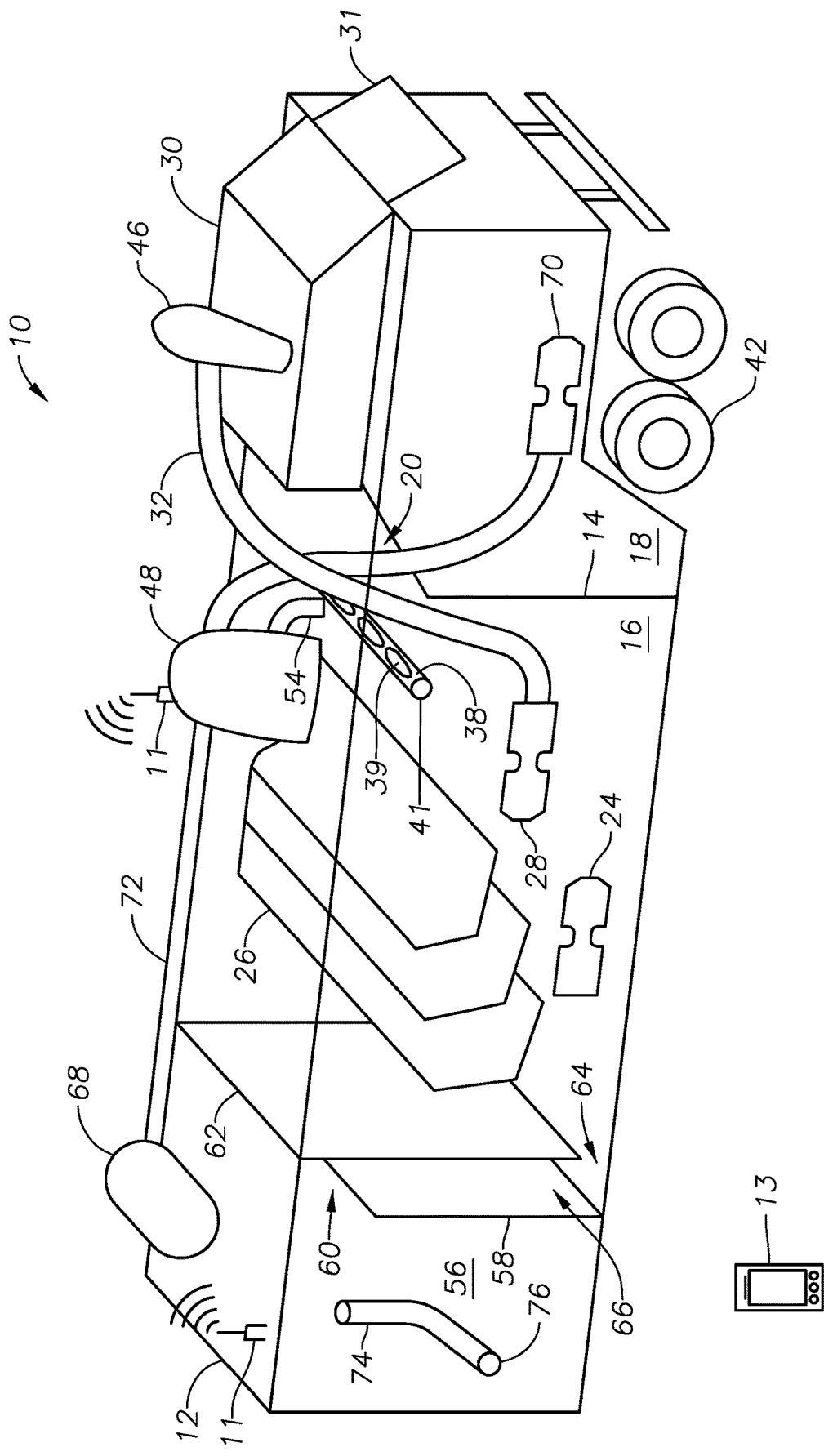
FIG. 3 depicts a perspective view of another system configured to separate a fluid mixture in accordance with embodiments of the disclosure.

FIG. 3 depicts another embodiment of a system 10. This system is similar to the embodiments of FIG. 1 and FIG. 2, with some additional features. The vessel 12 includes an additional chamber 56. This third chamber 56 is separated from the other chambers by a vertical weir 58 formed in the vessel 12 interior. Vertical weir 58 forms a barrier wall extending across the vessel 12 from side to side. This weir extends upward from the vessel 12 floor, leaving a gap 60 near the upper section of the chamber. Another vertical weir 62 is positioned inside the vessel 12 near weir 58, further separating the third chamber 56. Weir 62 extends downward from the top of the vessel 12, leaving a gap 64 near the vessel floor. Fluid communication is maintained between the chambers 16, 56 via a partition 66 defined by the two weirs 58, 62. Fluids from the first chamber 16 may flow into the third chamber 56 via the partition 66, but substances lighter than water (e.g. liquid hydrocarbons) in the first chamber are blocked from flow by the weir 62 extending from the top of the vessel 12.

The embodiment of FIG. 3 includes a skimmer 38 mounted in the first chamber 16 to collect mediums lighter than water (e.g. liquid hydrocarbon) contained in the solid-laden fluid mixture. As the liquid hydrocarbon collects it is recovered through the skimmer 38, which in this embodiment consists of a slotted pipe extending across the width of the chamber 16. The lighter-than-water medium enters the slots 39 in the skimmer 38 and is conveyed out of the vessel 12 via a skimmer port 41. The lighter-than-water liquid hydrocarbon is then transferred via a hose or conduit to be collected in an awaiting exterior tank (not shown). The lighter-than-water medium flows out of the skimmer port 41 via gravity feed as the vessel 12 processes the liquid mixtures admitted into the first chamber 16 as described herein. In some embodiments, the skimmer 38 may be configured to move up and down within the vessel 12 interior, floating near the surface of the contained liquid mixture (e.g., by forming the skimmer from appropriate materials that float). In such embodiments, the skimmer 38 may be connected to a hose coupled to the discharge port 38 and may include a pump to expel the lighter-than-water medium when the fluid level is below the port. It will be appreciated by those skilled in the art that the skimmer 38 may be configured and mounted within the vessel 12 in different ways as known in the art.

The embodiment of FIG. 3 includes an additional separator 68 mounted above the third chamber 56. This separator 68 is similar to the separator 46 mounted above the second chamber 14. In this embodiment, one or more eductors 70 are mounted in the second chamber 18. The separator 68 above the third chamber 56 is coupled to the eductor(s) 70 in the second chamber 18 via hosing or tubing 72. In operation, the eductor(s) 70 sends a discharge stream of fluid and any residual solids in the second chamber 18 to the separator 68 mounted on top of the third chamber 56. Any residual solids left in the separated fluid is removed from the discharge stream by the separator 68 and the clean fluid is gravity fed into the third chamber 56. As such, the third chamber 56 can be considered a clean effluent chamber. Removed residual solids can be conveyed via a conduit for discharge along with the solids discharged from the shaker 30. The shaker 30 includes a solids discharge tray 31 that can be extended over the edge of the vessel 12 to allow the dewatered solids to feed into an awaiting container, catch box, or conveyor to elsewhere as desired.

Once the fluid in the third chamber 56 gets to a certain height, it will flow into a standpipe 74 mounted in the chamber. The standpipe 74 is coupled to a discharge port 76 formed at the side of the vessel 12. The discharge port 76 is configured to permit the connection of a hose or other conduit means as known in the art. The solids-free fluid in the third chamber 56 is conveyed via the discharge port 76 to an additional storage tank or other location as desired.

As depicted in FIG. 3, some embodiments may also be configured with conventional electronics and computer technology including processors and antennas 11 to provide for wired or wireless control and operation of the system 10 or its individual components and subsystems. Performance and operation of the system 10 and/or its components and subsystems may be monitored and controlled using a computing device 13. System 10 embodiments may also include digital level readouts disposed on the vessel 12 and configured to wirelessly transmit data representing fluid levels in the respective vessel chambers 16, 18, 56 to the computing device 13. The computing device 13 may include, for example, a mobile phone, a tablet, a laptop computer, a desktop computer, an electronic notepad, a server computing device, etc. In some implementations, the system 10 can be implemented for remote monitoring and control via a cloud-computing architecture. In yet other embodiments, the computing device 13 may be programmed to automatically control the system 10 and/or its components and subsystems to adjust the volume of fluids processing and discharge from the vessel 12 depending on the mixture level data wirelessly received from digital level readouts. It will be appreciated by those skilled in the art that the processors may be configured to perform as described herein using conventional software using any suitable computer language and electronics protocols.

Figure 4:
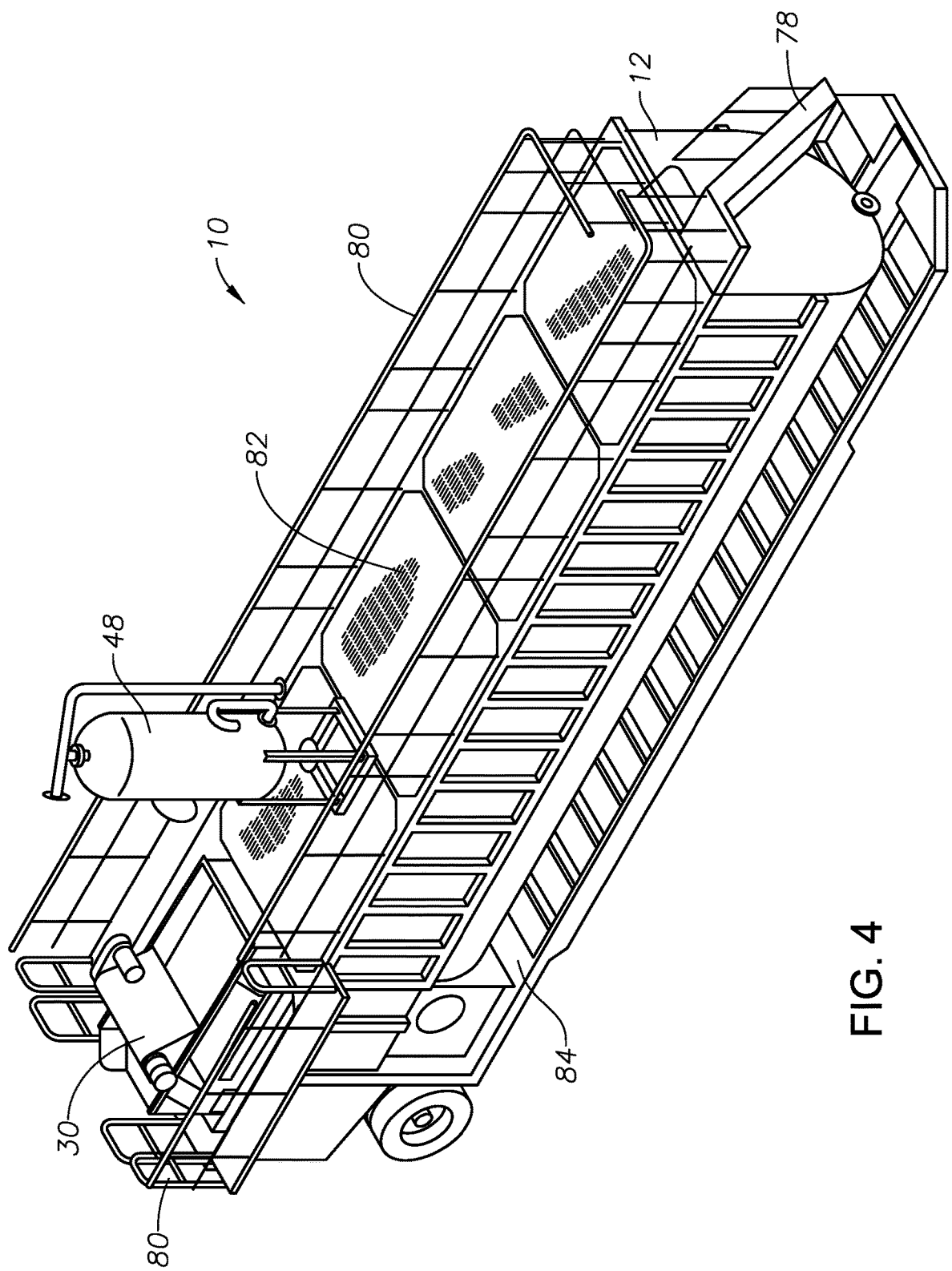
FIG. 4 depicts a perspective view of another system configured to separate a fluid mixture in accordance with embodiments of the disclosure.

FIG. 4 depicts another embodiment of a system 10. This system 10 is similar to the embodiments of FIGS. 1-3, with some additional features. The vessel 12 is implemented with a ladder or steps 78 at one end of the vessel 12 and rails 80 mounted at the top of the vessel to provide a safe walking area for an operator to service the system or make adjustments during operations. Grating 82 covers the tops of the vessel 12 chambers. In this embodiment, the vessel 12 is configured with an open space 84 between the underside of the chambers and the bottom of the vessel frame. It will be appreciated by those skilled in the art that some embodiments may be configured with aerodynamic vessel 12 designs, including the use of deflectors for high-speed on-road transport of the system 10 to desired locations. It will also be appreciated by those skilled in the art that embodiments of the disclosed systems 10 may be implemented with conventional pumps, motors, conduits, piping, controls, electronics, gauges, wiring, and hardware mounted inside and outside of the vessels 12 as known in the art. The open space 84 provides a convenient and protected area to mount the conduits, piping, wiring, motors, etc., of the system 10. This design streamlines the vessel 12 and provides a safer, less cluttered, top surface for an operator to service the system 10 or make adjustments during operations. For clarity of illustration, only the exterior of the vessel 12 is depicted configured with a shaker 30 and a degasser 48. It will be understood that the depicted system 10 may be implemented to include any or all of the features, apparatus, and details as described for the disclosed embodiments.

In some implementations of the disclosed embodiments, fluid mixture flow into a vessel 12 may be approximately 3-5 barrels per minute, with the eductor(s) 28 moving fluid at a rate of approximately 6-15 barrels per minute. Thus, the fluid mixture will flow to the separator 46 and the separated liquids will fall through the shaker 30 at a rate that is 1.5 to 5 times the rate the fluid mixture is being deposited into the vessel 12. As a result, a positive hydraulic pressure will be maintained within the vessel 12 chambers, pushing fluid from the second chamber 18 to the first chamber 16, creating a fluid barrier between the chambers along the space 20 near the top of the weir 14 physically dividing the chambers.

Figure 5:
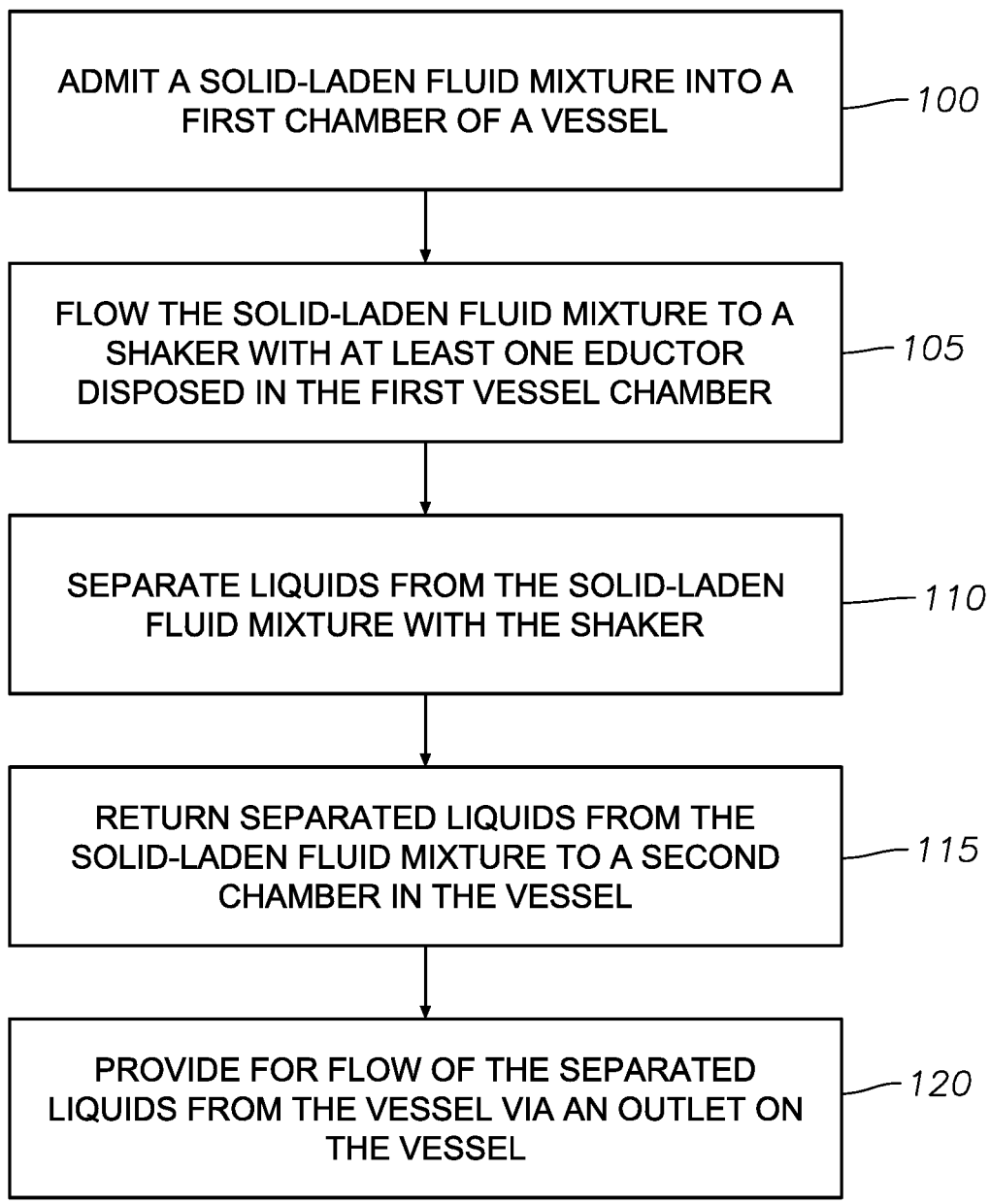
FIG. 5 illustrates an example flow diagram of a process for separating a fluid mixture in accordance with embodiments of the disclosure.

In accordance with some embodiments, FIG. 5 is a flow chart illustrating a process for separating a fluid mixture. At step 100, a solid-laden fluid mixture is admitted into a first vessel chamber. At step 105, the solid-laden fluid mixture is flowed to a shaker with at least one eductor disposed in the first vessel chamber. At step 110, liquids from the solid-laden fluid mixture are separated with the shaker. At step 115, separated liquids from the solid-laden fluid mixture are returned to a second vessel chamber. At step 120, flow of the separated liquids from the vessel is provided via an outlet on the vessel. This process may be implemented using the techniques and embodiments disclosed herein.

Advantages of the disclosed embodiments include a closed-loop fluids processing system, a smaller footprint eliminating the number of additional tanks required, reduced rental and transportation costs, a reduced need for additional logistical support equipment, providing fast and simple rig ups and rig downs and mobilizations, lower transportation and fluid disposal costs, conformity with environmental regulations, minimal operator decisions and errors, and eliminating the possibility of downstream fluid contamination.

In light of the principles and example embodiments described and depicted herein, it will be recognized that the example embodiments can be modified in arrangement and detail without departing from such principles. Also, the foregoing discussion has focused on particular embodiments, but other configurations are also contemplated. Even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. The terms "including" and "comprising" are used in an open-ended fashion, and thus should be interpreted to mean "including, but not limited to . . . ."

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A system for separating solids from a fluid mixture, comprising:
    a vessel with an inner compartment having a first chamber to receive a solid-laden fluid mixture;
    at least one eductor disposed in the first vessel chamber to flow the solid-laden fluid mixture to a shaker;
    the shaker configured to separate liquids from the solid-laden fluid mixture for return of the separated liquids to a second chamber in the inner compartment of the vessel;
    a weir disposed within the inner compartment of the vessel to divide the inner compartment and separate the first vessel chamber from the second vessel chamber,
    wherein the weir is configured to permit creation of a positive pressure fluid barrier such that fluid communication is allowed between the first vessel chamber and the second vessel chamber such that the separated liquids can mix with the solid-laden fluid mixture; and
    the vessel having an outlet to allow for flow of the separated liquids from the vessel.

2. The system of claim 1, further comprising a separator configured to receive the solid-laden fluid mixture prior to passage of the mixture to the shaker.

3. The system of claim 1, further comprising a degasser to remove gases from the solid-laden fluid mixture prior to passage of the mixture to the first vessel chamber.

4. The system of claim 1, further comprising at least one baffle disposed in the first vessel chamber.

5. The system of claim 1, further comprising a lighter-than-water medium skimmer disposed in the first vessel chamber.

6. The system of claim 1, wherein the vessel is configured for on-road transport.

7. The system of claim 1, further comprising at least one eductor disposed in the first vessel chamber to agitate the solid-laden fluid mixture in the chamber.

8. The system of claim 7, further comprising at least one eductor disposed in the second vessel chamber to flow the separated liquids to a third chamber in the inner compartment of the vessel.

9. The system of claim 8, wherein the vessel comprises a plurality of weirs disposed within the inner compartment of the vessel to separate the vessel chambers while allowing internal fluid communication between the chambers.

10. The system of claim 8, further comprising a separator configured to receive the separated liquids prior to passage of the liquids to the third vessel chamber.

11. The system of claim 8, further comprising a separator configured to receive the solid-laden fluid mixture prior to passage of the mixture to the shaker.

12. The system of claim 8, further comprising a degasser to remove gases from the solid-laden fluid mixture prior to passage of the mixture to the first vessel chamber.

13. The system of claim 8, further comprising a lighter-than-water medium skimmer disposed in the first vessel chamber.

14. The system of claim 8, wherein the vessel is configured for on-road transport.

15. A method for separating solids from a fluid mixture, comprising:
    admitting a solid-laden fluid mixture into a first chamber in an inner compartment of a vessel;
    flowing the solid-laden fluid mixture to a shaker with at least one eductor disposed in the first vessel chamber;
    separating liquids from the solid-laden fluid mixture with the shaker;
    returning separated liquids from the solid-laden fluid mixture to a second chamber in the inner compartment of the vessel;
    the vessel having at least one weir disposed within the inner compartment of the vessel to divide the inner compartment and separate the first vessel chamber from the second vessel chamber,
    wherein the at least one weir is configured to permit creation of a positive pressure fluid barrier such that fluid communication is allowed between the first vessel chamber and the second vessel chamber such that the separated liquids can mix with the solid-laden fluid mixture; and
    providing for flow of the separated liquids from the vessel via an outlet on the vessel.

16. The method of claim 15, further comprising agitating the solid-laden fluid mixture in the first vessel chamber using at least one eductor disposed in the chamber.

17. The method of claim 16, further comprising flowing the separated liquids to a third chamber in the inner compartment of the vessel using at least one eductor disposed in the second vessel chamber.

18. The method of claim 17, further comprising passing the separated liquids through a separator prior to passage of the separated liquids to the third vessel chamber.

19. The method of claim 17, further comprising passing the solid-laden fluid mixture through a separator prior to passage of the mixture to the shaker.

20. The method of claim 17, further comprising removing a lighter-than-water medium from the solid-laden fluid mixture in the first vessel chamber.

* * * * *